(12) United States Patent
Koshinz et al.

(10) Patent No.: US 8,554,032 B2
(45) Date of Patent: Oct. 8, 2013

(54) OPTICAL STAR COUPLER FOR PLASTIC OPTICAL FIBERS

(75) Inventors: Dennis Gary Koshinz, Bellevue, WA (US); Eric Y. Chan, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 112 days.

(21) Appl. No.: 13/316,682

(22) Filed: Dec. 12, 2011

(65) Prior Publication Data

US 2013/0148926 A1    Jun. 13, 2013

(51) Int. Cl.
G02B 6/00 (2006.01)
G02B 6/34 (2006.01)
G02B 6/36 (2006.01)

(52) U.S. Cl.
USPC ............................................. 385/46; 385/147

(58) Field of Classification Search
USPC ............................................. 385/46–50, 147
See application file for complete search history.

(56) References Cited

U.S. PATENT DOCUMENTS

| 4,200,356 | A |   | 4/1980  | Hawkes et al. |         |
|-----------|---|---|---------|---------------|---------|
| 4,265,514 | A | * | 5/1981  | Wellington et al. | 385/65 |
| 4,598,975 | A | * | 7/1986  | Bussard et al. | 385/78 |
| 4,707,069 | A | * | 11/1987 | Hoffman, III  | 385/99 |
| 4,822,128 | A |   | 4/1989  | Imoto et al.  |         |
| 4,995,692 | A |   | 2/1991  | Diliello et al. |       |
| 5,195,162 | A |   | 3/1993  | Sultan et al. |         |
| 5,642,447 | A | * | 6/1997  | Pan et al.    | 385/31  |
| 5,642,448 | A | * | 6/1997  | Pan et al.    | 385/31  |
| 5,652,814 | A | * | 7/1997  | Pan et al.    | 385/24  |
| 5,675,679 | A |   | 10/1997 | Yuuki         |         |
| 5,889,904 | A | * | 3/1999  | Pan et al.    | 385/24  |
| 5,966,484 | A |   | 10/1999 | Yuuki         |         |
| 6,125,228 | A |   | 9/2000  | Gong          |         |
| 7,965,913 | B2 |  | 6/2011  | Chan et al.   |         |
| 2008/0219623 | A1 | | 9/2008 | Sklarek et al. |        |

FOREIGN PATENT DOCUMENTS

EP    0568190 A1    11/1993
GB    2058396 A     4/1981

OTHER PUBLICATIONS

"Plastic Fiber Couplers/Splitters/Reflectors," Comcore Technologies, Inc., 1 page, accessed Oct. 12, 2011, http://www.comcore.com/products/category.asp?cid=10.
EP search report dated Mar. 18, 2013 regarding application 12195484.6-1504, reference NAM/P124968EP00, applicant The Boeing Company, 10 pages.
"OP850, Insertion Loss Measurement," OptoTest Corp., 1 page, accessed Jun. 22, 2012, http://www.optotest.com/DataSheets/OP850.pdf.
Chan et al., "Optical Coupler Testing System," U.S. Appl. No. 13/533,608, filed Jun. 26, 2012, 55 Pages.

* cited by examiner

*Primary Examiner* — Akm Enayet Ullah
(74) *Attorney, Agent, or Firm* — Yee & Associates, P.C.

(57) ABSTRACT

A method and apparatus for assembling an optical coupler system. A first plurality of optical fibers is connected to a first receptacle using an alignment system to align the first plurality of optical fibers in the first receptacle. A second plurality of optical fibers is connected to a second receptacle using the alignment system to align the second plurality of optical fibers in the second receptacle. The first receptacle is connected to a star coupler. The first plurality of optical fibers is optically connected to a mixing channel in the star coupler. The second receptacle is connected to the star coupler. The second plurality of optical fibers is optically connected to the mixing channel in the star coupler.

20 Claims, 15 Drawing Sheets

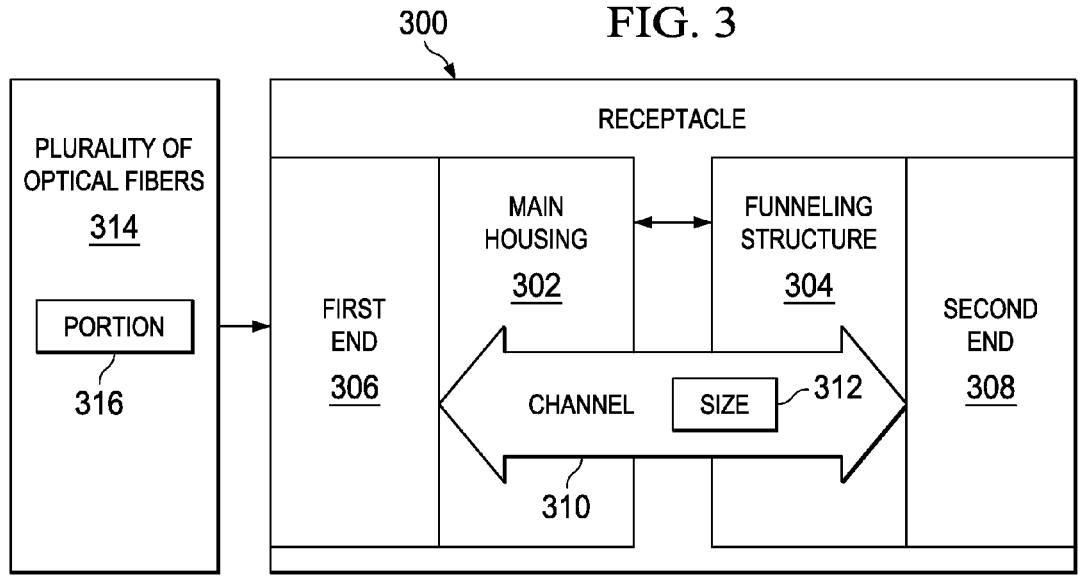
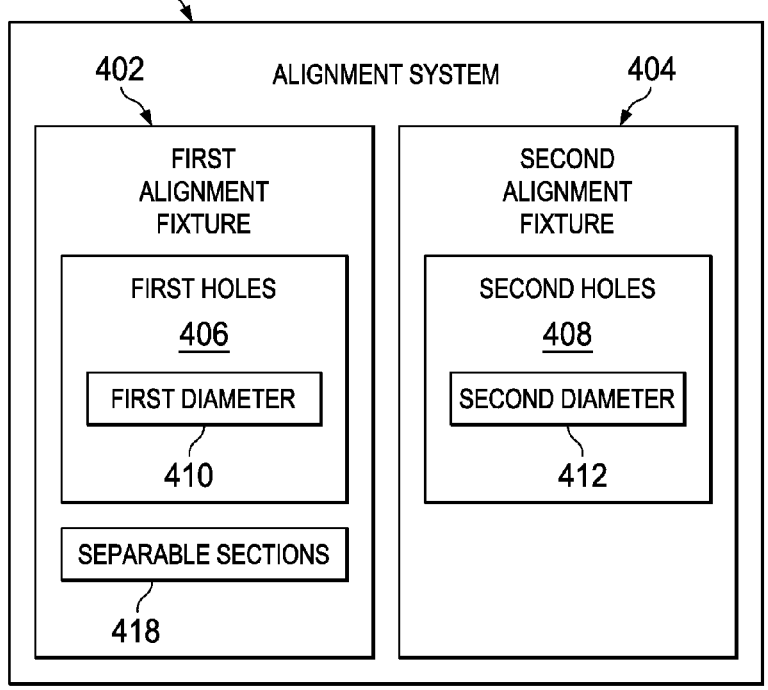

OPTICAL STAR COUPLER FOR PLASTIC OPTICAL FIBERS

BACKGROUND INFORMATION

1. Field

The present disclosure relates generally to transmitting optical signals and, in particular, to optical devices. Still more particularly, the present disclosure relates to a method and apparatus for sending signals using an optical star coupler.

2. Background

In sending information between devices, optical signals may be used to send the information. The information is encoded in the optical signals sent from one device to another device. With this type of medium, a transmitter encodes a message in an optical signal. The optical signal is sent through a medium, such as an optical fiber, to a receiver. The receiver then decodes the message from the received optical signal. With this type of transmission, networks using wires may be replaced or supplemented to include optical fibers over which optical signals are sent.

An optical fiber is a flexible, transparent fiber that may be made of silica, plastic, or other materials having desirable capabilities to carry optical signals.

The use of optical fibers may be more desirable than the use of wires. For example, optical fibers may permit transmission of optical signals over longer distances and at higher data rates than the use of metal wires. Optical signals sent over optical fibers may have a lower loss as compared to electrical signals sent over metal wires for the same distance.

Further, the use of optical fibers is also desirable, because these types of fibers are immune to electromagnetic interference. These and other characteristics make the use of optical fibers for transmitting information between devices desirable for vehicles, such as aircraft and spacecraft. Further, it is desirable for the optical fibers to meet the same requirements as the wires that they replace in a vehicle, such as an aircraft or a spacecraft.

Networks that communicate using optical signals may include devices, such as transmitters, receivers, switches, and optical couplers. Optical fibers using silica are commonly used in optical networks. These types of optical fibers may more expensive than desired as compared to the wires that they replace.

Another alternative to optical fibers made out of silica is an optical fiber made out of plastic. These types of fibers may be made out of polymethyl methacrylate (PMMA). Plastic optical fiber (POF) is often used as an alternative to glass optical fiber. Plastic optical fibers may be more cost effective than glass optical fibers and may not be as brittle as glass optical fibers. However, differences in material and physical characteristics between glass optical fibers and plastic optical fibers may result in devices designed for glass optical fibers providing poor performance when used with plastic optical fibers.

Therefore, it would be desirable to have a method and apparatus that takes into account at least one of the issues discussed above as well as possibly other issues.

SUMMARY

In one illustrative embodiment, an optical coupler system comprises a coupler housing having a first end and a second end, a mixing channel extending from the first end of the coupler housing to the second end of the coupler housing, a first receptacle, and a second receptacle. The mixing channel is configured to receive an input optical signal from a first optical fiber at the first end and split the input optical signal into a plurality of output optical signals at the second end. The first receptacle is configured to be connected to the first end of the coupler housing. The first receptacle has a main housing and a funneling structure. The main housing of the first receptacle is configured to receive a first plurality of optical fibers in a channel in the main housing. A portion of the first plurality of optical fibers is unjacketed, and the funneling structure of the first receptacle reduces a size of the channel of the first receptacle to receive the portion of the first plurality of optical fibers that is unjacketed. The second receptacle is configured to be connected to the second end of the coupler housing. The second receptacle has a main housing and a funneling structure. The main housing for the second receptacle is configured to receive a second plurality of optical fibers in a channel in the main housing of the second receptacle. A portion of the second plurality of optical fibers is unjacketed, and the funneling structure of the second receptacle reduces a size of the channel of the second receptacle to receive the portion of the second plurality of optical fibers that is unjacketed.

In another illustrative embodiment, an alignment system for aligning a plurality of optical fibers in a receptacle comprises a first alignment fixture having a first plurality of holes and a second alignment fixture having a second plurality of holes. The first alignment fixture is configured to receive the plurality of optical fibers. The second alignment fixture is configured to receive an unjacketed portion of the plurality of optical fibers. The first alignment fixture is configured to be placed relative to a first end of the receptacle and comprises removable sections. The second alignment fixture is configured to be placed relative to a second end of the receptacle.

In yet another illustrative embodiment, a method for assembling an optical coupler system is present. A first plurality of optical fibers is connected to a first receptacle using an alignment system to align the first plurality of optical fibers in the first receptacle. A second plurality of optical fibers is connected to a second receptacle using the alignment system to align the second plurality of optical fibers in the second receptacle. The first receptacle is connected to a star coupler. The first plurality of optical fibers is optically connected to a mixing channel in the star coupler. The second receptacle is connected to the star coupler. The second plurality of optical fibers is optically connected to the mixing channel in the star coupler.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives thereof will best be understood by reference to the following detailed description of an illustrative embodiment of the present disclosure when read in conjunction with the accompanying drawings, wherein:

FIG. 3 is an illustration of a block diagram of a receptacle in accordance with an illustrative embodiment;

FIG. 4 is an illustration of an alignment system in accordance with an illustrative embodiment;

DETAILED DESCRIPTION

Figure 1:
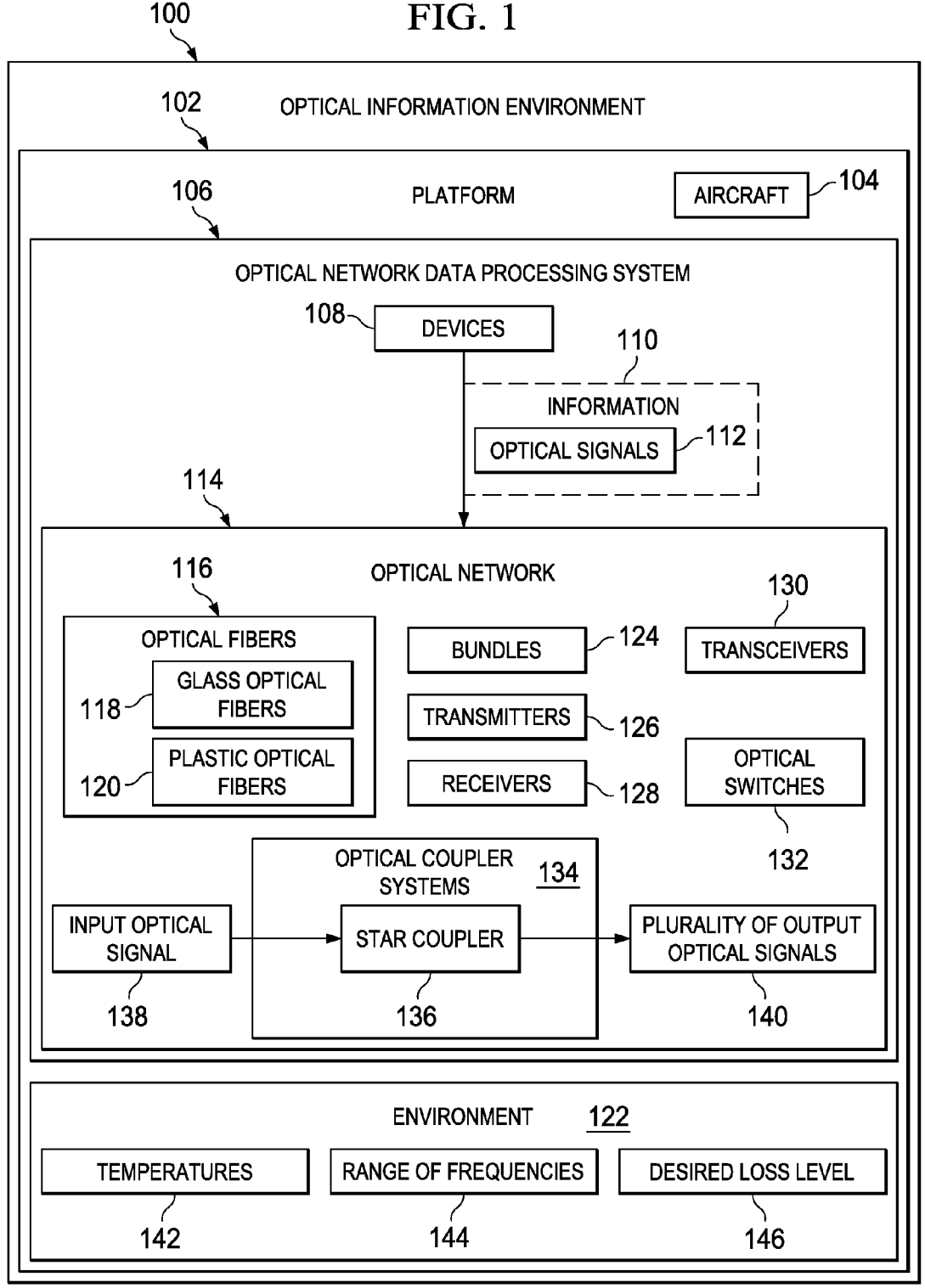
FIG. 1 is an illustration of an optical information environment in accordance with an illustrative embodiment.

The different illustrative embodiments recognize and take into account one or more different considerations. For example, the different illustrative embodiments recognize and take into account that the use of optical networks in a vehicle, such as an aircraft, requires an ability of the components to withstand the operating environment of the aircraft. For example, in an aircraft, optical fibers should be able to withstand temperature ranges that may be encountered in the aircraft. These temperature ranges may be from about −40 degrees Celsius to about 105 degrees Celsius. The different illustrative embodiments also recognize and take into account that the optical fibers used should provide an ability to carry optical signals in a range of frequencies used by transmitters, receivers, transceivers, or other similar devices. Additionally, the different illustrative embodiments also recognize and take into account that with the use of optical fibers, reduced loss in the transmission of signals is desirable.

The different illustrative embodiments recognize and take into account that plastic optical fibers are more suitable for use in an aircraft than glass optical fibers. Plastic optical fibers have a greater flexibility over the temperature ranges encountered in an aircraft. Further, optical fibers also have a lower weight. Using plastic optical fibers in place of glass optical fibers may reduce the weight of an aircraft by hundreds of pounds. Further, plastic optical fibers are also able to provide the range of frequencies desired for sending optical signals in an aircraft.

The different illustrative embodiments recognize and take into account that in reducing loss of transmission, couplers used with plastic optical fibers should be configured to couple the signals in a manner that reduces loss as much as possible. The different illustrative embodiments recognize and take into account that currently used optical couplers designed for use with glass optical fibers may result in a larger coupling loss than desired. These losses may occur from differences in diameter, optical characteristics, and refractive indexes between the couplers and the plastic optical fibers.

Also, the different illustrative embodiments recognize and take into account that it is desirable to connect increasingly large numbers of plastic optical fibers to couplers. The increase in the number of plastic optical fibers occurs with an increase in the complexity of optical networks, such as those used in aircraft. For example, it may be desirable to attach 30 or more plastic optical fibers to a coupler. Currently available couplers are unable to handle large numbers of plastic optical fibers. Most currently available couplers are only able to handle about 16 fibers, but have a lower than desired performance.

Therefore, the illustrative embodiments provide a method and apparatus for an optical coupler system for use in an optical network. In one illustrative embodiment, the optical coupler system comprises a coupler housing having a first end and a second end. The coupler housing has a mixing channel extending from the first end of the coupler housing to the second end of the coupler housing. The mixing channel is configured to receive an input signal from an optical fiber at the first end and split the input signal into a plurality of output signals at the second end. The coupler housing also includes a first receptacle and a second receptacle. The first receptacle is configured to be connected to the first end of the coupler housing. The second receptacle is configured to be connected to the second end of the coupler housing. The first receptacle has a main housing and a funneling structure. The main housing of the first receptacle is configured to receive a first plurality of optical fibers in a channel in the main housing. A portion of the first plurality of optical fibers is unjacketed, and the funneling structure of the first receptacle reduces a size of the channel of the first receptacle to receive the portion of the optical fiber that is unjacketed. The second receptacle also has a main housing and a funneling structure. The main housing for the second receptacle is configured to receive a second plurality of optical fibers in a channel in the main housing of the second receptacle. A portion of the second plurality of optical fibers is unjacketed, and the funneling structure of the second receptacle reduces a size of the channel in the first receptacle to receive a portion of the second plurality of optical fibers that is unjacketed.

With reference now to the figures and, in particular, with reference to FIG. 1, an illustration of an optical information environment is depicted in accordance with an illustrative embodiment. In this illustrative example, optical information environment 100 includes platform 102. Platform 102 takes the form of aircraft 104 in this illustrative example.

As illustrated, optical network data processing system 106 is located in platform 102. Optical network data processing system 106 includes devices 108 that send information 110 using optical signals 112.

In these illustrative examples, devices 108 may include at least one of computers, controllers, sensors, and other suitable types of devices. As used herein, the phrase "at least one of", when used with a list of items, means different combinations of one or more of the listed items may be used and only one of each item in the list may be needed. For example, "at least one of item A, item B, and item C" may include, for example, without limitation, item A or item A and item B. This example also may include item A, item B, and item C, or item B and item C.

In these illustrative examples, devices 108 are connected to optical network 114. Optical network 114 is the medium on which optical signals 112 are sent between devices 108. Optical network 114 includes optical fibers 116. As depicted, optical fibers 116 may be at least one of glass optical fibers 118 and plastic optical fibers 120. In these illustrative examples, plastic optical fibers 120 may be more prevalent than glass optical fibers 118 because of environment 122 that is present when platform 102 takes the form of aircraft 104.

In these illustrative examples, optical fibers 116 may be grouped into bundles 124. Further, transmitters 126, receivers 128, transceivers 130, and other suitable devices also may be associated with or used in devices 108 for exchanging optical signals 112 between devices 108 in optical network 114. These devices may be considered part of optical network 114 or part of devices 108, depending on the particular implementation.

Further, optical network 114 also includes optical switches 132 and optical coupler systems 134. Optical switches 132 may direct optical signals 112 to different optical fibers within optical fibers 116.

Optical coupler systems 134 may couple signals from one plurality of optical fibers to another plurality of optical fibers. In these illustrative examples, optical coupler systems 134 include star coupler 136. Star coupler 136 is a device that receives input optical signal 138 and splits input optical signal 138 into plurality of output optical signals 140. In these illustrative examples, plurality of output optical signals 140 has equal intensities. One or more illustrative embodiments may be implemented in optical coupler systems 134 to reduce loss of transmission of optical signals 112 that pass through optical coupler systems 134.

In these illustrative examples, plastic optical fibers 120 are used in optical network data processing system 106 when platform 102 takes the form of aircraft 104. Plastic optical fibers 120 may provide desired performance for temperatures 142 that occur in environment 122 during operation of aircraft 104. Further, plastic optical fibers 120 also provide for transmission of optical signals 112 using range of frequencies 144 for devices 108 in aircraft 104. Additionally, plastic optical fibers 120 also may have desired loss level 146 when transmitting optical signals 112. In addition, with the use of optical coupler systems 134 in accordance with an illustrative embodiment, desired loss level 146 also may be reached in optical network data processing system 106.

Figure 2:
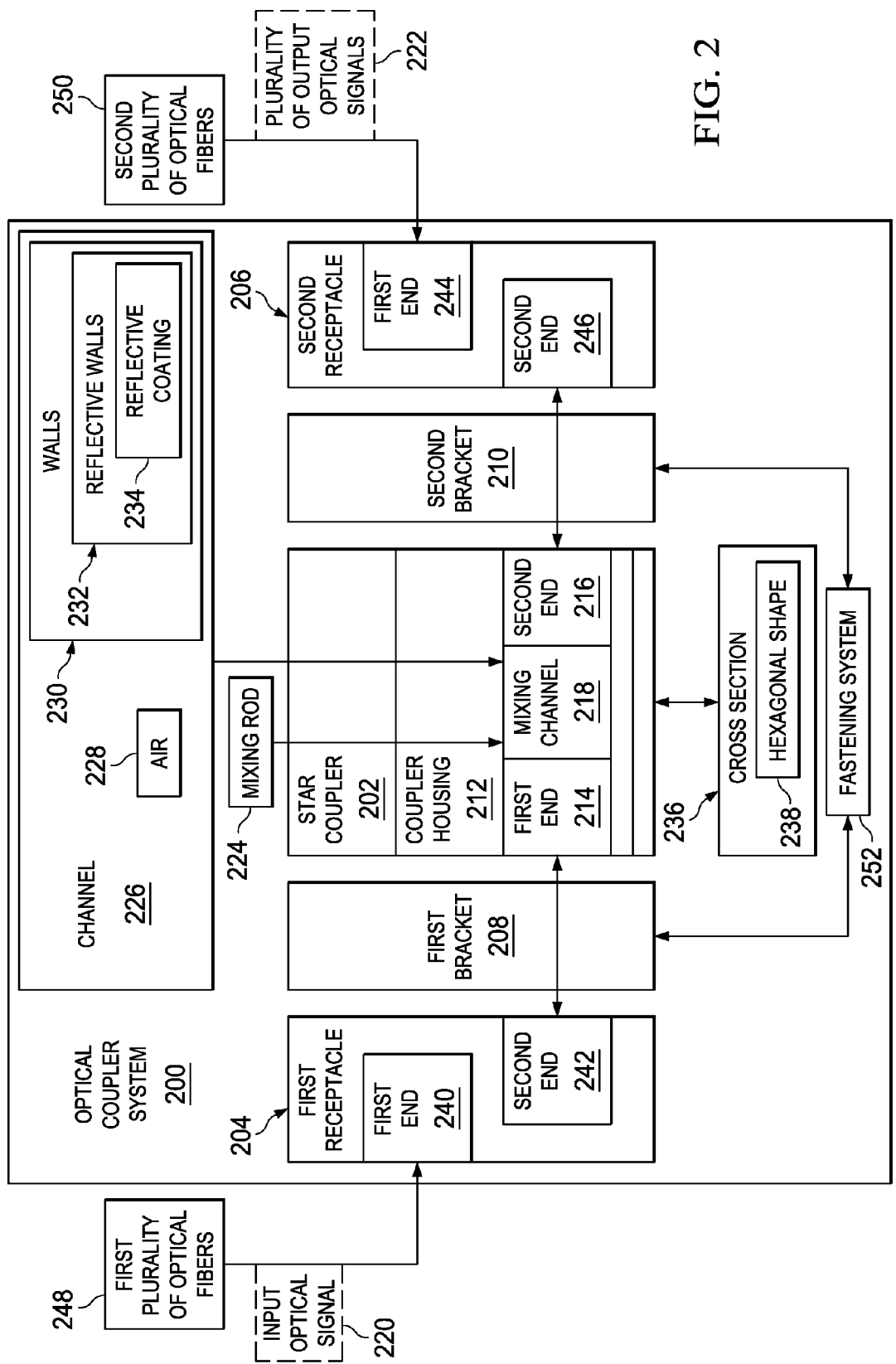
FIG. 2 is an illustration of a block diagram of an optical coupler system in accordance with an illustrative embodiment.

Turning now to FIG. 2, an illustration of a block diagram of an optical coupler system is depicted in accordance with an illustrative embodiment. In this illustrative example, optical coupler system 200 comprises star coupler 202, first receptacle 204, second receptacle 206, first bracket 208, and second bracket 210. Star coupler 202 has coupler housing 212 with first end 214 and second end 216.

Coupler housing 212 may be comprised of a material selected from at least one of metal, aluminum, steel, titanium, a composite material, plastic, and other suitable materials. The material selected for coupler housing 212 may be one that provides a desired level of mechanical strength, durability, and other suitable properties.

Mixing channel 218 extends through coupler housing 212 from first end 214 to second end 216. In these illustrative examples, mixing channel 218 is configured to receive input optical signal 220 in mixing channel 218 at first end 214 of coupler housing 212. Input optical signal 220 is split into plurality of output optical signals 222 as input optical signal 220 travels through mixing channel 218. Plurality of output optical signals 222 are output at mixing channel 218 at second end 216 of coupler housing 212.

In these illustrative examples, mixing channel 218 is a medium that provides for the splitting or multiplexing of input optical signal 220. The multiplexing takes input optical signal 220 from an optical fiber in first plurality of optical fibers 248 and generates plurality of output optical signals 222 that are output to second plurality of optical fibers 250. In this example, an input optical signal is received from one optical fiber in first plurality of optical fibers 248 at a time.

In another illustrative example, more than one input optical signal may be received at the same time. In this case, each input optical signal received has a different wavelength from the other input optical signals. As a result, mixing channel 218 generates plurality of output optical signals 222 for each input signal at the different wavelengths. In other words, each of second plurality of optical fibers 250 would receive each of the input optical signals at the different wavelengths at the same time.

In these illustrative examples, mixing channel 218 may be mixing rod 224, channel 226 with walls 230 that are reflective walls 232, or a combination of the two. When mixing channel 218 is mixing rod 224, mixing rod 224 extends through coupler housing 212 from first end 214 to second end 216. Mixing rod 224 may be comprised of various materials that have an index of a fraction that are close to the index of a fraction for optical fibers 116 in FIG. 1. In particular, with the use of plastic optical fibers 120, mixing rod 224 may have an index of a fraction similar to those used in plastic optical fibers 120 in FIG. 1.

In these illustrative examples, the material selected for use in mixing rod 224 may be any material that is transparent with a low enough level of attenuation for the particular wavelength or wavelengths used in the optical signals and the type of optical fibers. In these illustrative examples, mixing rod 224 may be comprised of a material selected from at least one of polymethyl methacrylate, polyperfluorobutenylvinylether, perfluorinated polymer, glass, optical ultraviolet adhesive, and other suitable materials.

In other illustrative examples, mixing channel 218 may comprise channel 226 with air 228 extending between first end 214 and second end 216 of coupler housing 212. Channel 226 has walls 230. Walls 230 are reflective walls 232. Reflective walls 232 may be formed by polishing walls 230 or placing reflective coating 234 on walls 230.

In these illustrative examples, mixing channel 218 has cross section 236. Cross section 236 is selected to reduce loss in input optical signal 220 as it propagates within mixing channel 218 to form plurality of output optical signals 222. In these illustrative examples, cross section 236 is selected to be hexagonal shape 238. Of course, other shapes may be used, depending on the particular implementation. Other shapes may include, for example, without limitation, a circular shape, a triangular shape, a pentagonal shape, an octagonal shape, and other suitable types of shapes. In some examples, the shape may be irregular rather than symmetrical as in these examples.

The length and width of mixing channel 218 may be selected to reduce coupling loss. The selection of these parameters may be performed using simulations or testing different mixing channels to identify one that has a desired coupling loss. The optimum length and diameter may be affected by the number of fibers.

In these illustrative examples, first receptacle 204 has first end 240 and second end 242. In a similar fashion, second receptacle 206 has first end 244 and second end 246.

In these illustrative examples, first receptacle 204 is configured to receive first plurality of optical fibers 248 at first end 240 of first receptacle 204. In a similar fashion, second receptacle 206 is configured to receive second plurality of optical fibers 250 at first end 244 of second receptacle 206. Second end 242 of first receptacle 204 is configured to be connected to first end 214 of coupler housing 212. Second end 246 of second receptacle 206 is configured to be connected to second end 216 of coupler housing 212. In these illustrative examples, this connection is configured to provide an optical connection between first plurality of optical fibers 248 and second plurality of optical fibers 250 with mixing channel 218.

The connection may be made using first bracket 208 and second bracket 210. First bracket 208 is configured to connect second end 242 of first receptacle 204 with first end 214 of coupler housing 212. Second bracket 210 is configured to connect second end 246 of second receptacle 206 with second end 216 of coupler housing 212.

In particular, first bracket 208 may be a sleeve configured to receive second end 242 of first receptacle 204 and first end 214 of coupler housing 212. Second bracket 210 may also be a sleeve configured to receive second end 246 of second receptacle 206 and second end 216 of coupler housing 212. Fastening system 252 may be used with first bracket 208 and second bracket 210 in connecting first receptacle 204 and second receptacle 206 to coupler housing 212.

With reference now to FIG. 3, an illustration of a block diagram of a receptacle is depicted in accordance with an illustrative embodiment. In this illustrative example, receptacle 300 is an example of components for first receptacle 204 or second receptacle 206 in FIG. 2. In this illustrative example, receptacle 300 comprises main housing 302 with funneling structure 304. First end 306 is at the beginning of main housing 302, and second end 308 of receptacle 300 is at the end of funneling structure 304. In this illustrative example, funneling structure 304 is associated with main housing 302.

When one component is "associated" with another component, the association is a physical association in these depicted examples. For example, a first component may be considered to be associated with a second component by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

As illustrated, channel 310 extends through main housing 302 and funneling structure 304. Channel 310 has size 312. Size 312 of channel 310 in main housing 302 is configured to receive plurality of optical fibers 314 with a jacket. In other words, an optical fiber in plurality of optical fibers 314 has a structure that covers the optical fiber. The structure may be, for example, at least one of a resin layer, a jacket layer, a coating, and other suitable materials. This form of the optical fiber may be referred to as an optical cable.

Channel 310 decreases in size 312 in funneling structure 304. The decrease in size 312 is configured to receive portion 316 of plurality of optical fibers 314 that is unjacketed. In other words, the size of plurality of optical fibers 314 is smaller in diameter in portion 316 that is unjacketed. The unjacketed portion of plurality of optical fibers 314 is the portion of plurality of optical fibers 314 in which the jacket has been removed. The portion of plurality of optical fibers 314 without jackets may be referred to as being exposed. This jacket may add strength to the fiber but does not affect or contribute to the optical waveguide properties of the fiber in these illustrative examples.

With reference now to FIG. 4, an illustration of an alignment system is depicted in accordance with an illustrative embodiment. Alignment system 400 is configured to align plurality of optical fibers 314 for placement in receptacle 300 in FIG. 3.

In this illustrative example, alignment system 400 comprises first alignment fixture 402 and second alignment fixture 404. First alignment fixture 402 has first holes 406, and second alignment fixture 404 has second holes 408. First holes 406 in first alignment fixture 402 have first diameter 410. Second holes 408 in second alignment fixture 404 have second diameter 412. First diameter 410 is configured to receive an optical fiber with a jacket. Second diameter 412 is configured to receive an optical fiber that is unjacketed.

In these illustrative examples, first alignment fixture 402 and second alignment fixture 404 may be placed on either end of receptacle 300. In these illustrative examples, first alignment fixture 402 is comprised of separable sections 418. Separable sections 418 are configured to separate such that separable sections 418 may be removed from around plurality of optical fibers 314 without having to slide plurality of optical fibers 314 through first holes 406.

The illustration of optical information environment 100 and the different components in the environment, as well as components used to assemble optical coupler systems, are not meant to imply physical or architectural limitations to the manner in which these components may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although platform 102 is shown as aircraft 104, platform 102 may take other forms in other illustrative examples. For example, without limitation, other illustrative embodiments may be applied to a mobile platform, a stationary platform, a land-based structure, an aquatic-based structure, a space-based structure, and/or some other suitable platform. More specifically, the different illustrative embodiments may be applied to, for example, without limitation, a submarine, a bus, a personnel carrier, a tank, a train, an automobile, a spacecraft, a space station, a satellite, a surface ship, a power plant, a dam, a manufacturing facility, a building, and/or some other suitable platform.

As another illustrative example, in some cases, optical network data processing system 106 may be used with a wired network data processing system or may be a hybrid system that includes wired lines within the network.

Figure 5:
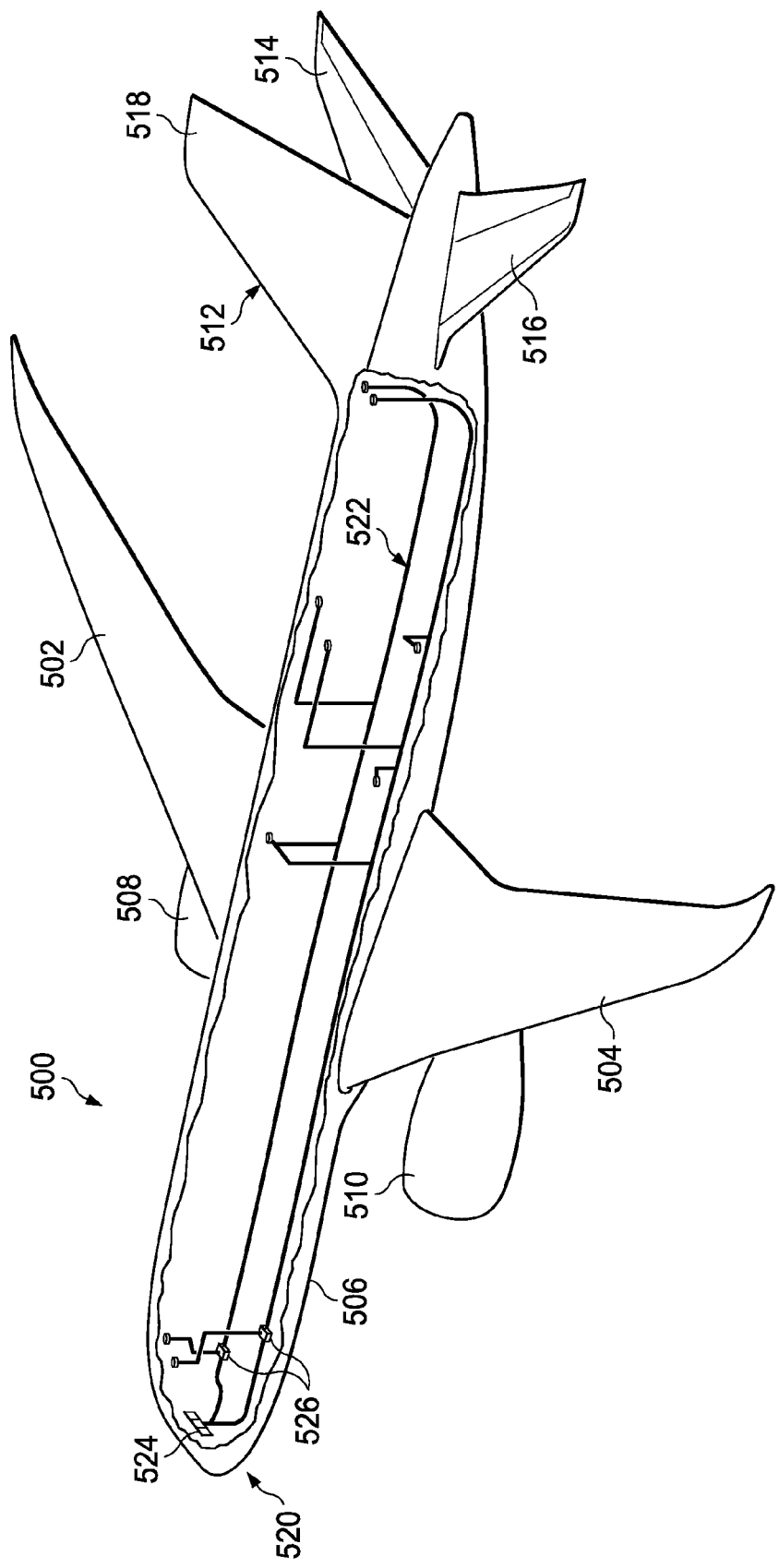
FIG. 5 is an illustration of an aircraft in accordance with an illustrative embodiment.

Turning now to FIG. 5, an illustration of an aircraft is depicted in accordance with an illustrative embodiment. Aircraft 500 is an illustration of one implementation for aircraft 104 in which optical network data processing system 106 in FIG. 1 may be implemented.

Aircraft 500 has wing 502 and wing 504 attached to body 506. Aircraft 500 also includes engine 508 attached to wing 502 and engine 510 attached to wing 504. Tail section 512 of body 506 has horizontal stabilizer 514, horizontal stabilizer 516, and vertical stabilizer 518. In these illustrative examples, optical network data processing system 520 includes optical network 522. Devices, such as flight deck displays 524, flight control computers 526, and other components, may be connected to optical network 522. In these illustrative examples, optical coupler systems, such as optical coupler system 200 in FIG. 2, may be used in different locations of optical network 522 in aircraft 500.

Figure 6:
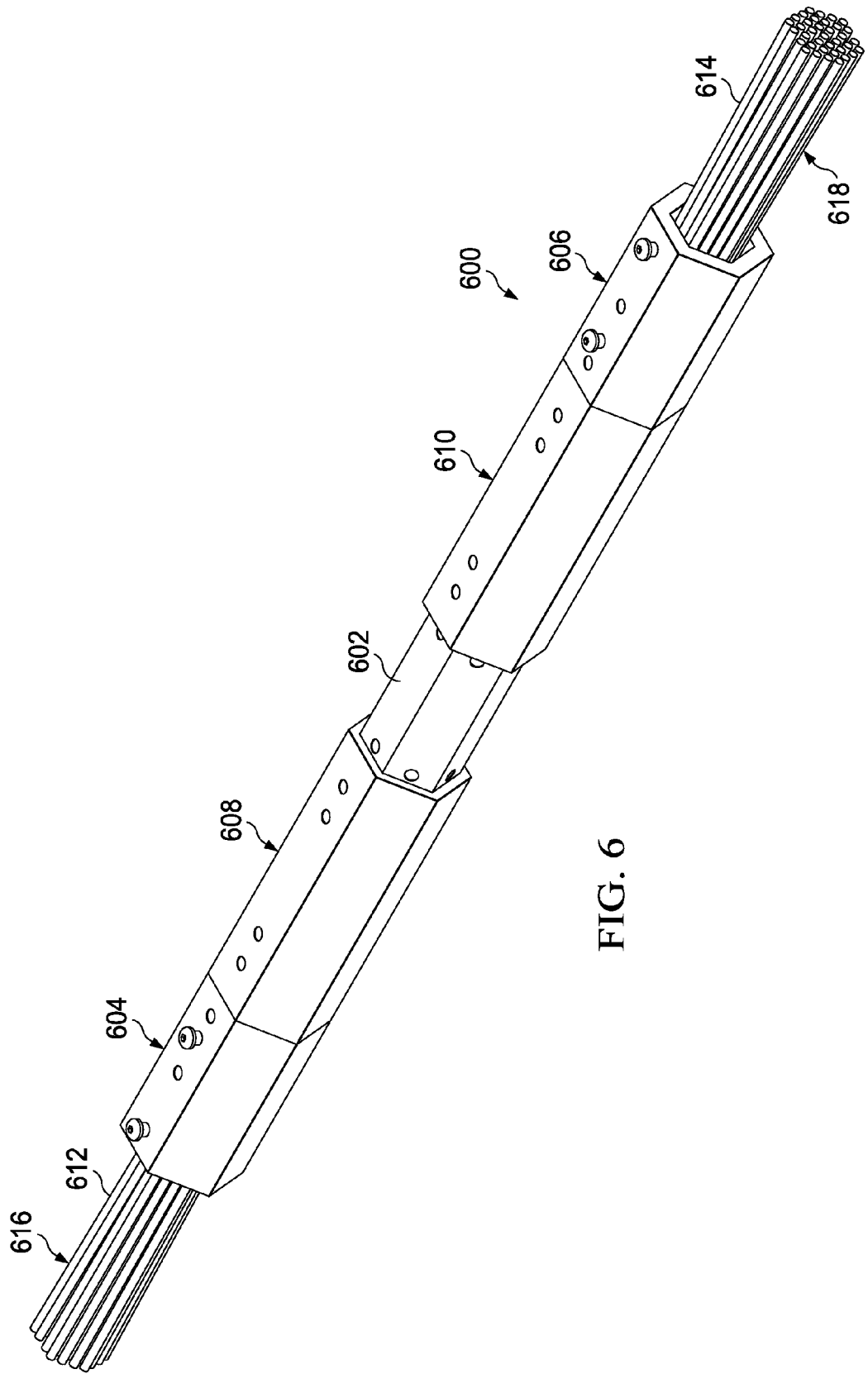
FIG. 6 is an illustration of an optical coupler system in accordance with an illustrative embodiment.

Turning now to FIG. 6, an illustration of an optical coupler system is depicted in accordance with an illustrative embodiment. In this illustrative example, optical coupler system 600 is shown in an assembled form.

In this illustrative example, optical coupler system 600 comprises star coupler 602, first receptacle 604, second receptacle 606, first bracket 608, and second bracket 610. As depicted, first plurality of optical fibers 612 are connected to first receptacle 604. Second plurality of optical fibers 614 are connected to second receptacle 606. First plurality of optical fibers 612 may form first bundle 616. Second plurality of optical fibers 614 may form second bundle 618 in these illustrative examples.

As can be seen, first receptacle 604 is connected to star coupler 602 by first bracket 608. Second receptacle 606 is connected to star coupler 602 by second bracket 610. This connection provides an optical connection between first plurality of optical fibers 612 with star coupler 602 and second plurality of optical fibers 614 with star coupler 602. As can be seen in these illustrative examples, first bracket 608 takes the form of a sleeve through which first receptacle 604 and a portion of star coupler 602 may be received. Second bracket 610 also takes the form of a sleeve in which a portion of second receptacle 606 and a portion of star coupler 602 may be received.

Figure 7:
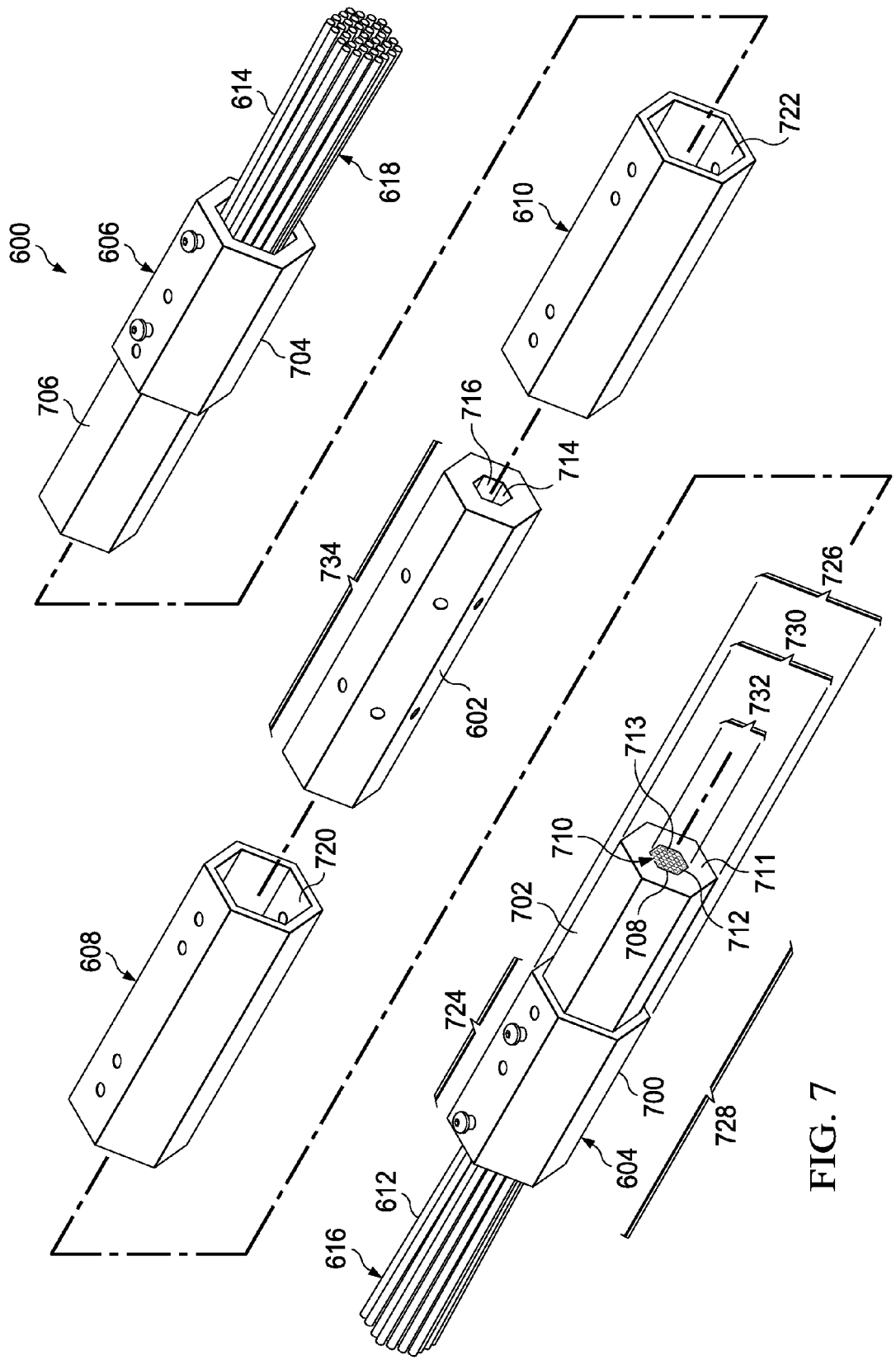
FIG. 7 is an illustration of an optical coupler system in an unassembled state in accordance with an illustrative embodiment.

With reference now to FIG. 7, an illustration of an optical coupler system in an unassembled state is depicted in accordance with an illustrative embodiment. In this illustrative example, optical coupler system 600 is shown unassembled. As can be seen in this example, first receptacle 604 has main housing 700 and funneling structure 702. In a similar fashion, second receptacle 606 has main housing 704 and funneling structure 706.

As can be seen in this view, ends 708 of first plurality of optical fibers 612 at end 711 of first receptacle 604 are exposed and arranged in hexagonal shape 710 within channel 712 of first receptacle 604. In these illustrative examples, ends 708 of first plurality of optical fibers 612 are polished ends 713. Hexagonal shape 710 may have a width that corresponds to a width of hexagonal shape 714 for mixing channel 716 in star coupler 602.

Further, in this view, first bracket 608 is an elongate structure having channel 720 that is hexagonal in shape. In a similar fashion, second bracket 610 is also an elongate structure having channel 722 that is hexagonal in shape.

In these illustrative examples, main housing 700 has length 724 and width 726. Length 724 is, in this illustrative example, about 1.0 inch. Width 726 is about 0.7 inches in this illustrative example. Main housing 704 may have a length and a width that is substantially the same as the length and the width of main housing 700, respectively. As depicted, first bracket 608 and second bracket 610 have substantially the same width as main housing 700.

Further, funneling structure 702 has length 728 and width 730. In this illustrative example, length 728 is about 3.0 inches, and width 730 is about 0.5 inches. Funneling structure 706 may have a length and a width that is substantially the same as the length and the width of funneling structure 702, respectively.

As depicted, channel 712 of funneling structure 702 has width 732. In this illustrative example, width 732 is about 0.25 inches. Channel 716 of star coupler 602 may have substantially the same width as channel 712 of funneling structure 702. Similarly, the channel (not shown) of funneling structure 706 may also have substantially the same width as channel 712 of funneling structure 702.

Star coupler 602 has length 734. Length 734 is about 2.0 inches in this illustrative example. First bracket 608 and second bracket 610 have substantially the same length as star coupler 602.

The dimensions illustrated for components in FIG. 7 are only provided for depicting an example of dimensions that may be used. The examples are not intended to limit the manner in which different illustrative embodiments may be implemented and other values for the dimensions may be used in other implementations.

Figure 8:
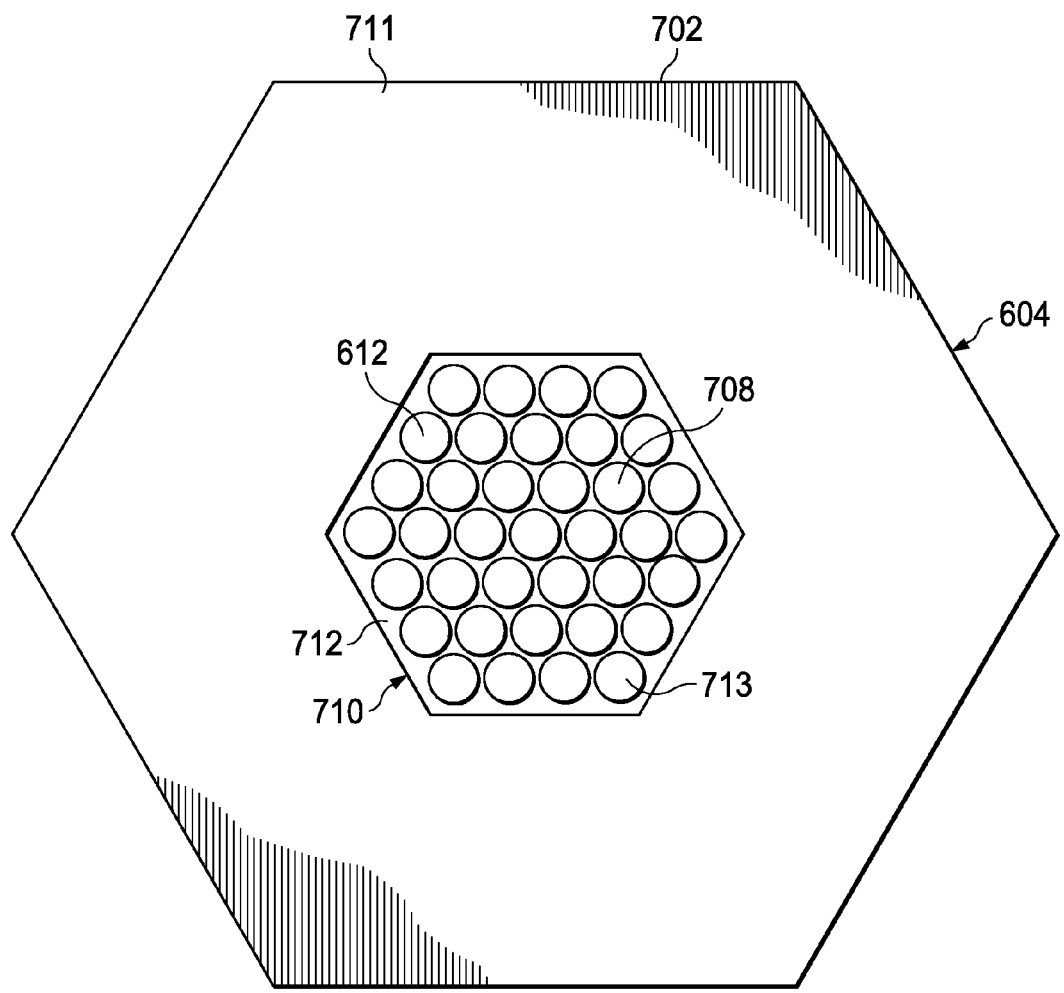
FIG. 8 is an illustration of an end of a first receptacle in accordance with an illustrative embodiment.

Turning now to FIG. 8, an illustration of end 711 of first receptacle 604 is depicted in accordance with an illustrative embodiment. As can be seen in this illustrative example, first plurality of optical fibers 612 have polished ends 713 in hexagonal shape 710 within channel 712.

Figure 9:
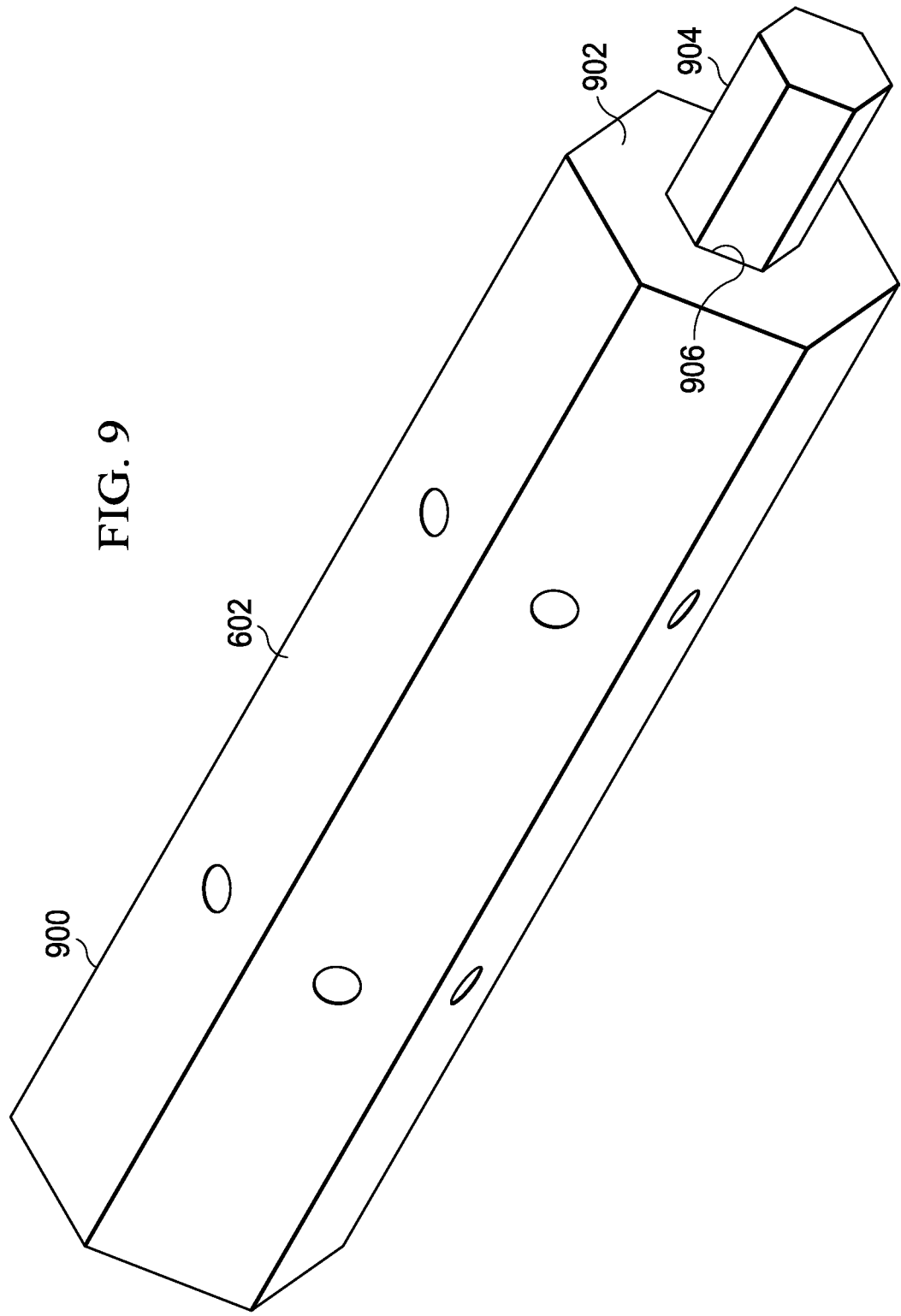
FIG. 9 is an illustration of a star coupler in accordance with an illustrative embodiment.

Turning now to FIG. 9, an illustration of a star coupler is depicted in accordance with an illustrative embodiment. In this illustrative example, star coupler 602 comprises housing 900. Housing 900 has mixing channel 902. In this illustrative example, mixing channel 902 is hexagonal rod 904 located in channel 906 within housing 900.

Figure 10:
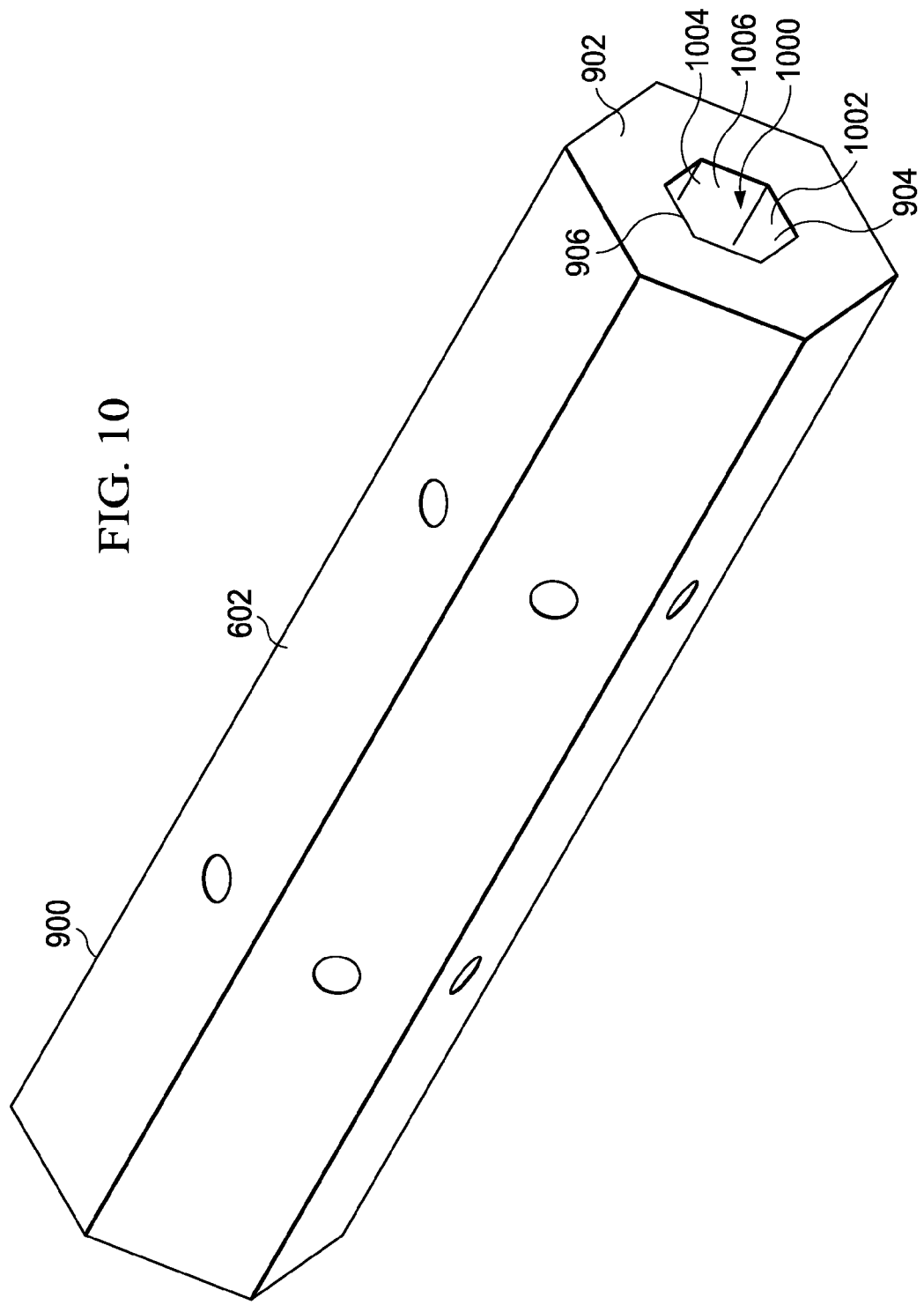
FIG. 10 is another illustration of a star coupler in accordance with an illustrative embodiment.

With reference now to FIG. 10, another illustration of a star coupler is depicted in accordance with an illustrative embodiment. In this illustrative example, star coupler 602 has mixing channel 1000. Mixing channel 1000 is comprised of channel 906 with air interface column 1002. Additionally, walls 1004 take the form of reflective walls 1006 to form mixing channel 902.

Figure 11:
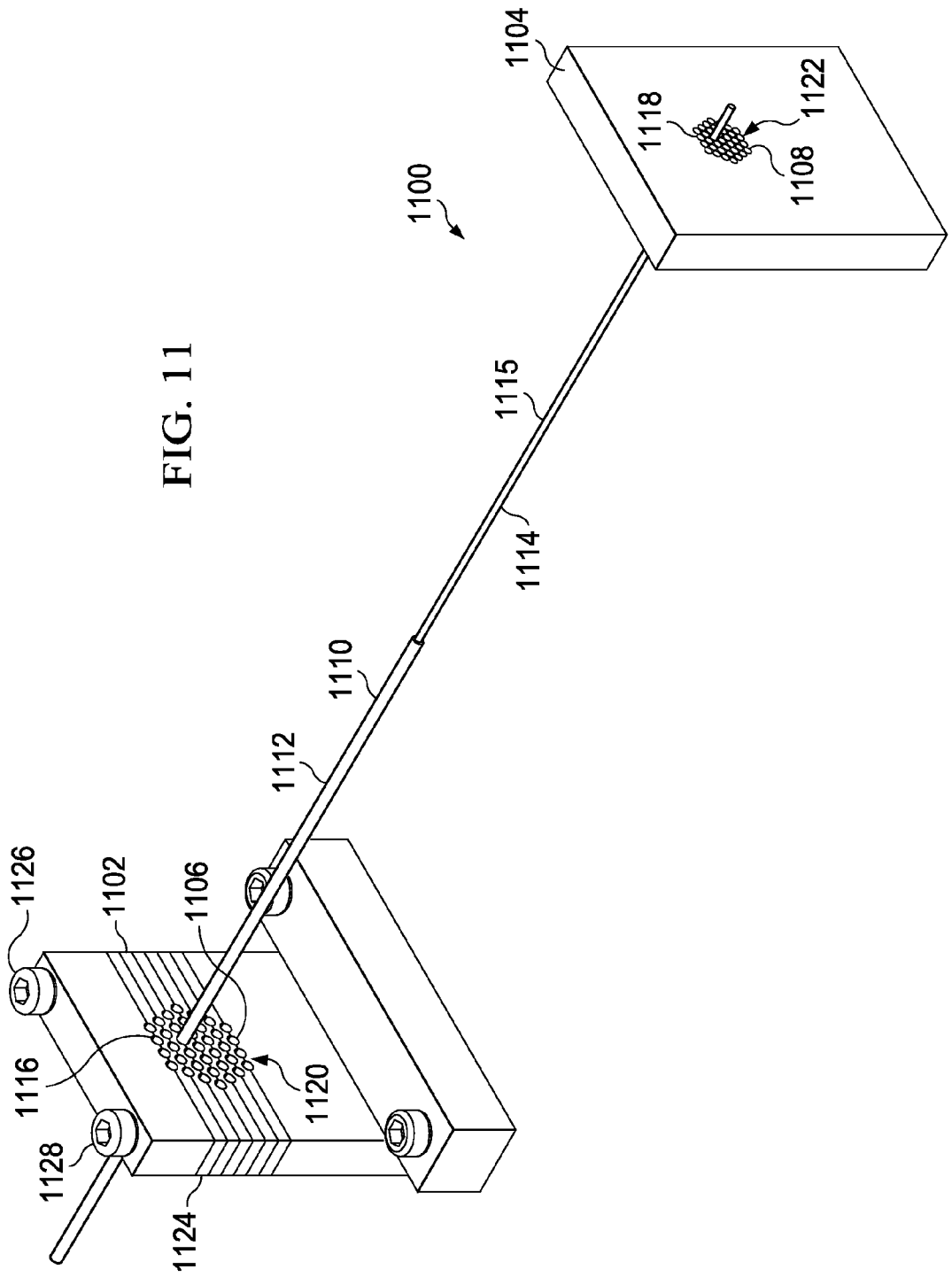
FIG. 11 is an illustration of an alignment system in accordance with an illustrative embodiment.

With reference now to FIG. 11, an illustration of an alignment system is depicted in accordance with an illustrative embodiment. In this illustrative example, alignment system 1100 is an example of one implementation for alignment system 400 in FIG. 4. As can be seen in this illustrative example, alignment system 1100 comprises first alignment fixture 1102 and second alignment fixture 1104.

As can be seen in these illustrative examples, first alignment fixture 1102 has first holes 1106, and second alignment fixture 1104 has second holes 1108. In these illustrative examples, first holes 1106 have first pattern 1120, and second holes 1108 have second pattern 1122. As depicted, first pattern 1120 and second pattern 1122 are hexagonal patterns. Further, each hole in first holes 1106 corresponds to a hole in second holes 1108.

First holes 1106 have a diameter configured to receive an optical fiber, such as optical fiber 1110, with jacket 1112. In these illustrative examples, second holes 1108 are also configured to receive optical fiber 1110. In particular, second holes 1108 are configured to receive portion 1114 of optical fiber 1110 that is unjacketed in section 1115.

In this illustrative example, optical fibers are placed through first hole 1116 in first holes 1106. Optical fiber 1110 extends through second hole 1118 in second holes 1108. First hole 1116 in first pattern 1120 of first holes 1106 corresponds to second hole 1118 in second pattern 1122 in second holes 1108.

In these illustrative examples, first alignment fixture 1102 is comprised of removable sections 1124. Removable sections 1124 are held together by post 1126 and post 1128 in this illustrative example. In other words, removable sections 1124 may be removed such that first holes 1106 do not enclose the optical fibers. For example, removable sections 1124 may be removed or disassembled to allow for removal of first alignment fixture 1102 from optical fiber 1110 without having to slide optical fiber 1110 through first hole 1116.

Figure 12:
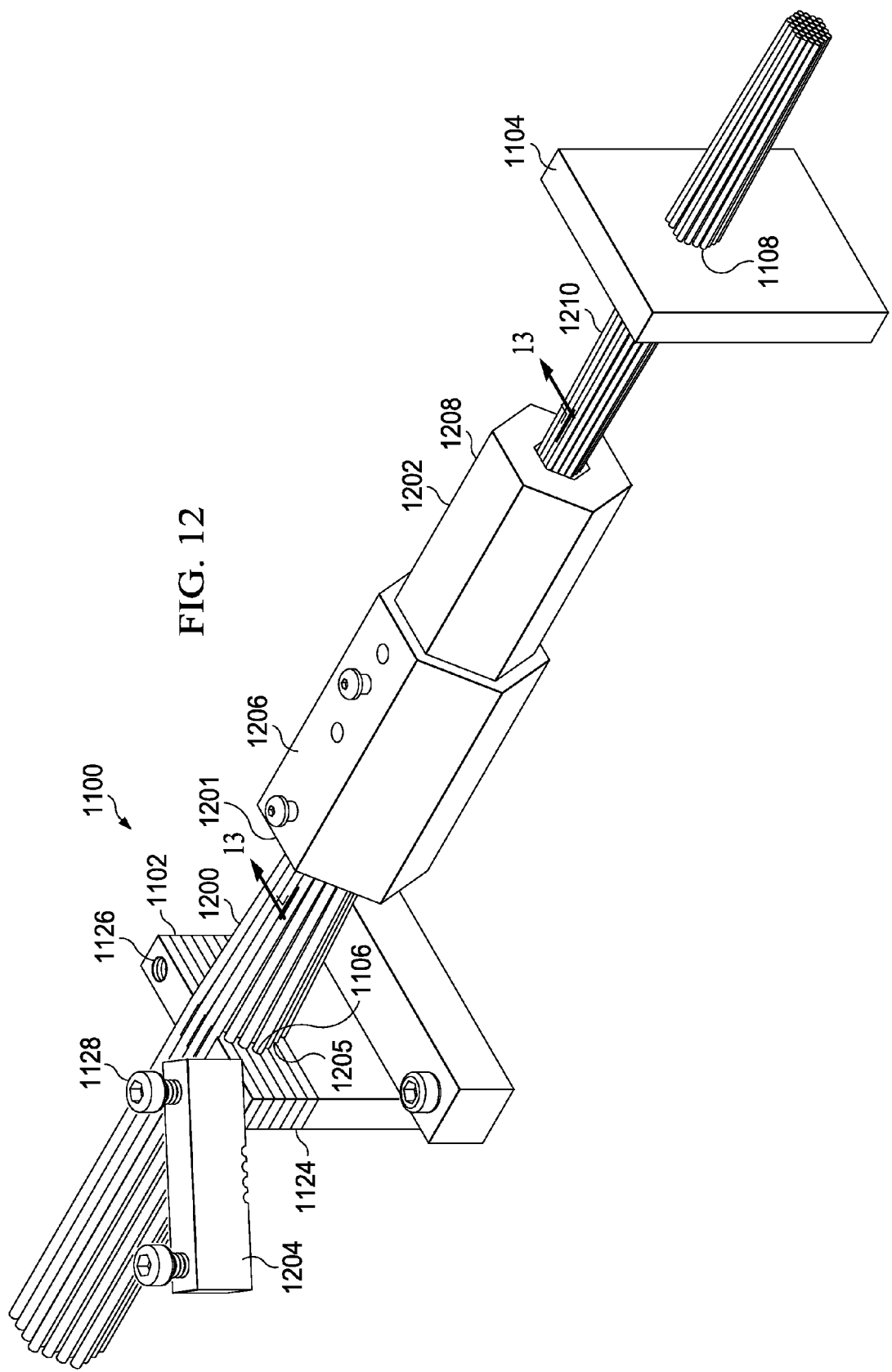
FIG. 12 is an illustration of a receptacle with a plurality of optical fibers aligned in an alignment system in accordance with an illustrative embodiment.

Turning now to FIG. 12, an illustration of a receptacle with a plurality of optical fibers aligned in an alignment system is depicted in accordance with an illustrative embodiment. In this illustrative example, plurality of optical fibers 1200 has been placed into channel 1201 in receptacle 1202 using alignment system 1100.

Plurality of optical fibers 1200 is connected to receptacle 1202 after placement into receptacle 1202. In these illustrative examples, the connection of plurality of optical fibers 1200 to receptacle 1202 may be made using an adhesive placed into channel 1201 with plurality of optical fibers 1200.

In these illustrative examples, removable sections 1124 may be held in place by post 1126 and post 1128. Removal of post 1126 and/or post 1128 may allow removable sections 1124 to be taken apart. As can be seen, section 1204 in removable sections 1124 has been moved to expose holes 1205 in first holes 1106.

In this illustrative example, receptacle 1202 has main housing 1206 and funneling structure 1208. As can be seen, main housing 1206 is configured to receive plurality of optical fibers 1200 with a jacket. Funneling structure 1208 is configured to receive portion 1210 of plurality of optical fibers 1200 that are unjacketed.

Figure 13:
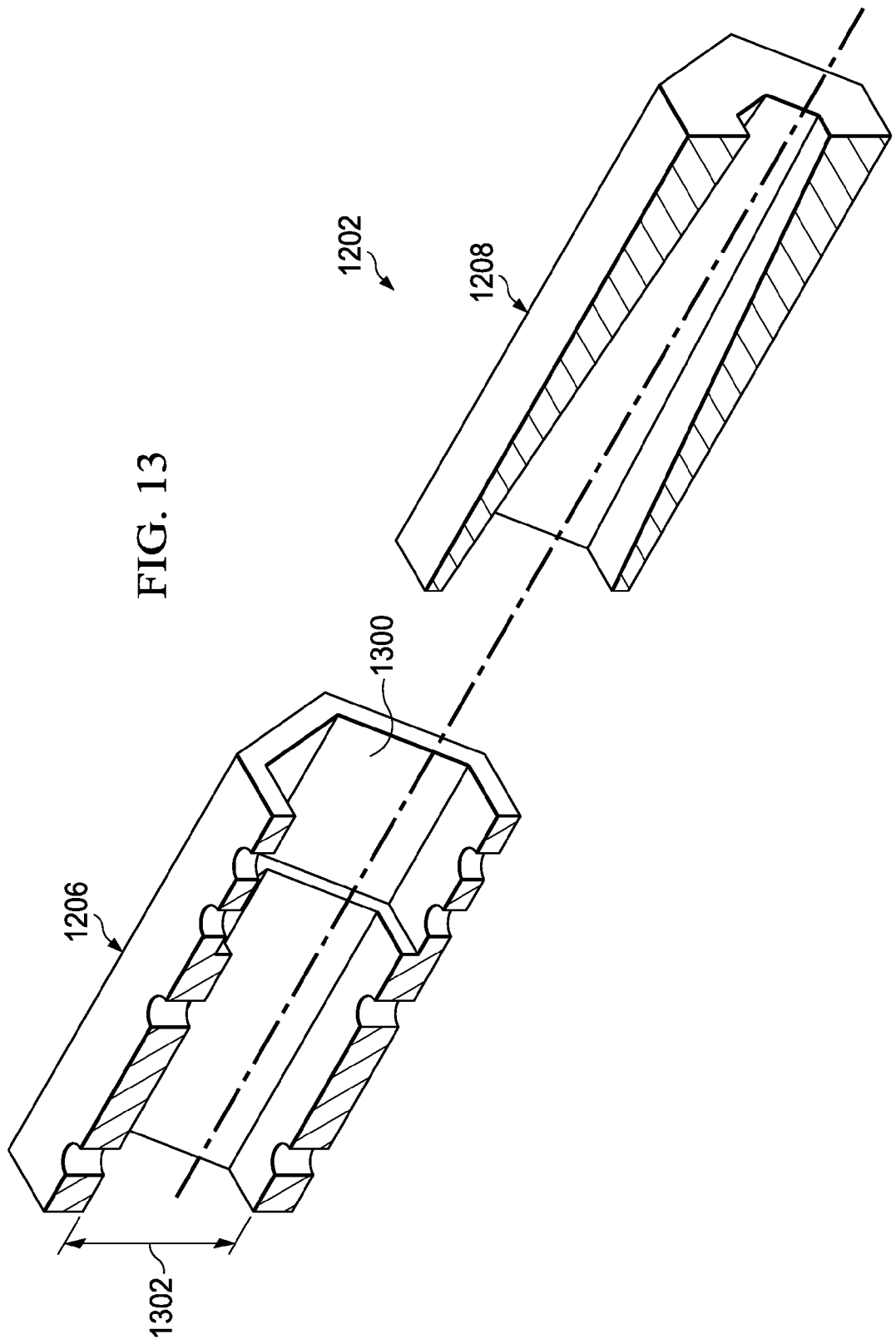
FIG. 13 is an illustration of components for a receptacle shown in an exploded cross-sectional view in accordance with an illustrative embodiment.

With reference now to FIG. 13, an illustration of components for a receptacle shown in an exploded cross-sectional view taken along lines 13-13 in FIG. 12 is depicted in accordance with an illustrative embodiment. In this illustrative example, main housing 1206 and funneling structure 1208 are illustrated in a cross-sectional exploded view.

As depicted, main housing 1206 in receptacle 1202 has channel 1300. Channel 1300 has diameter 1302 that is configured to receive plurality of optical fibers 1200 with a jacket. Channel 1300 changes in diameter in funneling structure 1208 in a manner that holds portion 1210 of plurality of optical fibers 1200 in FIG. 12 in a desired configuration within channel 1300. In this illustrative example, the configuration is in a hexagonal cross section.

The different components shown in FIGS. 5-13 may be combined with components in FIGS. 1-4, used with components in FIGS. 1-4, or a combination of the two. Additionally, some of the components in FIGS. 5-13 may be illustrative examples of how components shown in block form in FIGS. 1-4 can be implemented as physical structures.

Figure 14:
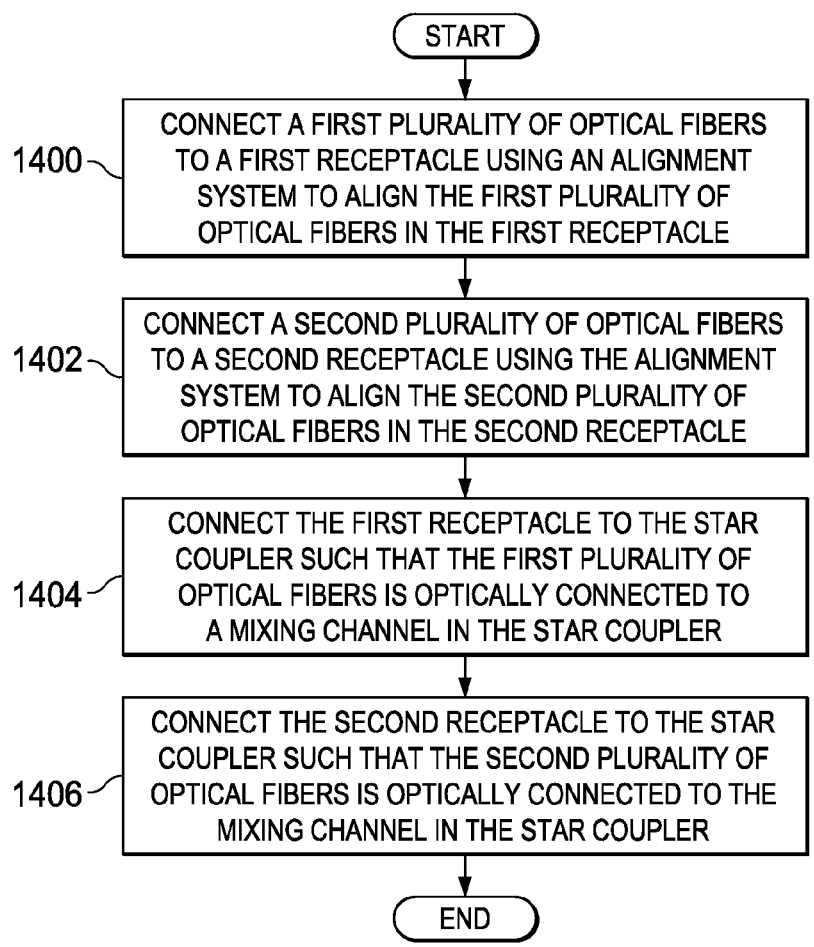
FIG. 14 is an illustration of a flowchart of a process for assembling a coupler system in accordance with an illustrative embodiment.

With reference now to FIG. 14, an illustration of a flowchart of a process for assembling a coupler system is depicted in accordance with an illustrative embodiment. The process illustrated in FIG. 14 may be used to assemble optical coupler systems 134 in FIG. 1.

The process begins by connecting a first plurality of optical fibers to a first receptacle using an alignment system to align the first plurality of optical fibers in the first receptacle (operation 1400). The process then connects a second plurality of optical fibers to a second receptacle using the alignment system to align the second plurality of optical fibers in the second receptacle (operation 1402). The alignment in operation 1400 and in operation 1402 is performed to place the optical fibers in a desired configuration within the channels of the receptacles. This configuration is a hexagonal shape.

The first receptacle is then connected to the star coupler such that the first plurality of optical fibers is optically connected to a mixing channel in the star coupler (operation 1404). The process then connects the second receptacle to the star coupler such that the second plurality of optical fibers is optically connected to the mixing channel in the star coupler (operation 1406), with the process terminating thereafter.

Figure 15:
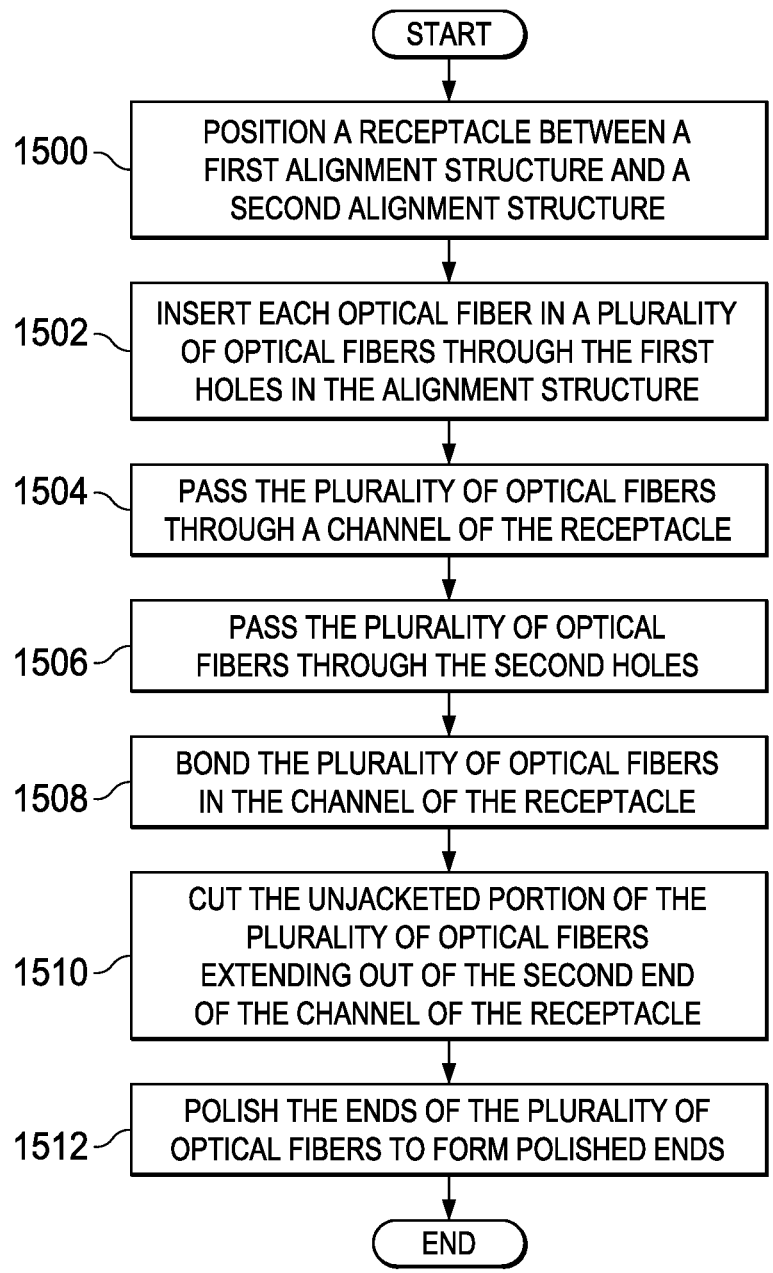
FIG. 15 is an illustration of a flowchart of a process for connecting a plurality of optical fibers to a receptacle in accordance with an illustrative embodiment.

Turning now to FIG. 15, an illustration of a flowchart of a process for connecting a plurality of optical fibers to a receptacle is depicted in accordance with an illustrative embodiment. This process may be used to place and connect first plurality of optical fibers 612 to first receptacle 604 and second plurality of optical fibers 614 to second receptacle 606 in FIG. 6.

The process begins by positioning a receptacle between a first alignment structure and a second alignment structure (operation 1500). The process then inserts each optical fiber in a plurality of optical fibers through the first holes in the alignment structure (operation 1502). The process then passes the plurality of optical fibers through a channel of the receptacle (operation 1504). In operation 1504, the plurality of optical fibers is passed through a first end of the receptacle into the channel and exits the channel at a second end of the receptacle. The process then passes the plurality of optical fibers through the second holes (operation 1506). In operation 1506, the unjacketed portion of the plurality of optical fibers is passed through the second holes.

Each fiber passed through a hole in the first holes in the first alignment structure is passed through a corresponding hole in the second holes in the second alignment structure. The corresponding hole is selected such that the plurality of optical fibers has a desired configuration within a channel of the receptacle. The plurality of optical fibers is bonded in the channel of the receptacle (operation 1508). In these illustrative examples, adhesive may be placed into the channel with the plurality of optical fibers.

The process then cuts the unjacketed portion of the plurality of optical fibers extending out of the second end of the channel of the receptacle (operation 1510). The process then polishes the ends of the plurality of optical fibers to form polished ends (operation 1512), with the process terminating thereafter.

Figure 16:
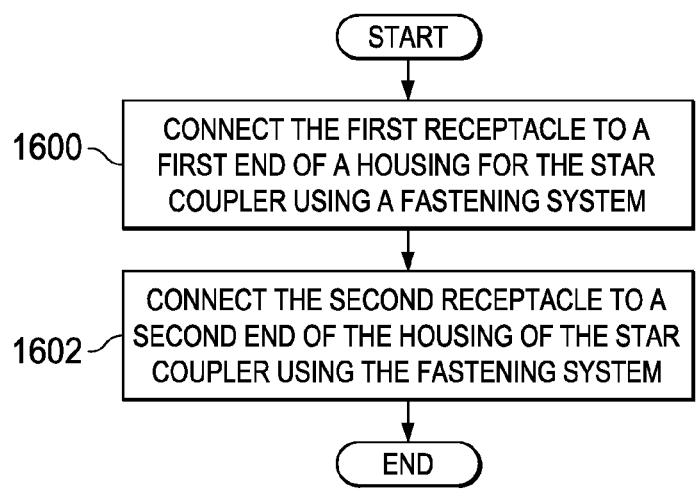
FIG. 16 is an illustration of a flowchart of a process for connecting a receptacle to a star coupler in accordance with an illustrative embodiment.

Turning now to FIG. 16, an illustration of a flowchart of a process for connecting a receptacle to a star coupler is depicted in accordance with an illustrative embodiment. In this illustrative example, the process may be used to connect first receptacle 604 and second receptacle 606 to star coupler 602 in FIG. 6.

The process begins by connecting the first receptacle to a first end of a housing for the star coupler using a fastening system (operation 1600). The fastening system may be, for example, fastening system 252 in FIG. 2. In particular, the fastening system may be implemented using first bracket 208 and second bracket 210. This first connection is an optical connection to a mixing channel in the star coupler as well as a physical connection to the housing for the star coupler in the illustrative examples.

The process then connects the second receptacle to a second end of the housing of the star coupler using the fastening system (operation 1602), with the process terminating thereafter. In a similar fashion, the second connection includes optically connecting the optical fibers in the second receptacle to the mixing channel in the star coupler as well as physically connecting the second receptacle to the housing of the star coupler.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, segment, function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, although not shown, an operation may be included in the flowchart in FIG. 16 to place a coating on the mixing channel and the ends of the optical fibers that are coupled to the mixing channel to reduce a loss of transmission in the optical signals. This coating may be an index matching adhesive.

Figure 17:
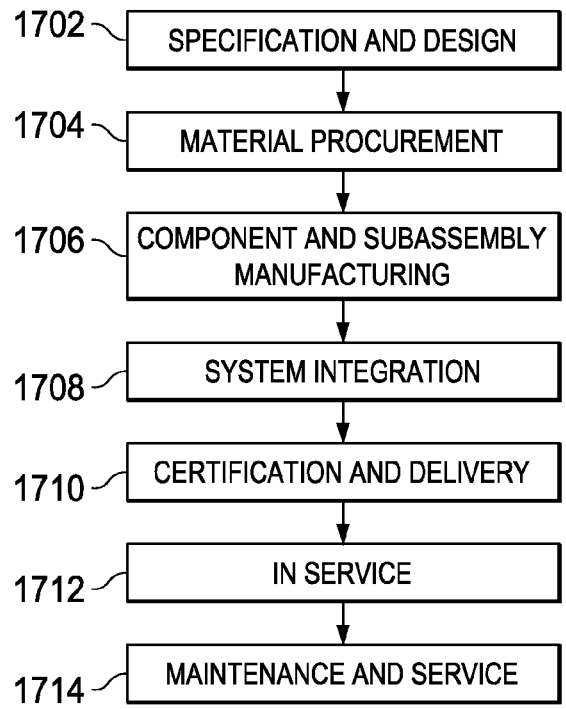
FIG. 17 is an illustration of an aircraft manufacturing and service method in accordance with an illustrative embodiment.
Figure 18:
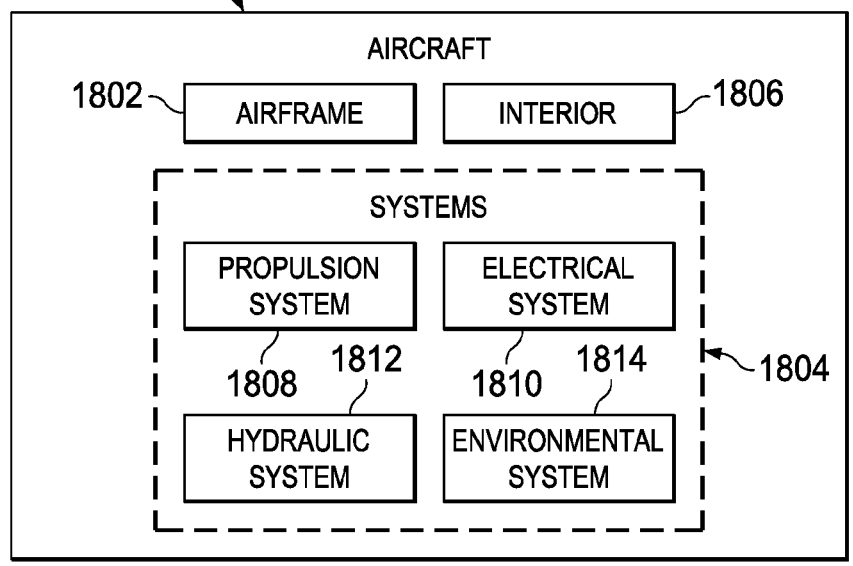
FIG. 18 is an illustration of an aircraft in which an illustrative embodiment may be implemented.

Illustrative embodiments of the disclosure may be described in the context of aircraft manufacturing and service method 1700 as shown in FIG. 17 and aircraft 1800 as shown in FIG. 18. Turning first to FIG. 17, an illustration of an aircraft manufacturing and service method is depicted in accordance with an illustrative embodiment. During pre-production, aircraft manufacturing and service method 1700 may include specification and design 1702 of aircraft 1800 in FIG. 18 and material procurement 1704.

During production, component and subassembly manufacturing 1706 and system integration 1708 of aircraft 1800 in FIG. 18 takes place. Thereafter, aircraft 1800 may go through certification and delivery 1710 in order to be placed in service 1712. While in service 1712 by a customer, aircraft 1800 is scheduled for routine maintenance and service 1714, which may include modification, reconfiguration, refurbishment, and other maintenance or service.

Each of the processes of aircraft manufacturing and service method 1700 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 18, an illustration of an aircraft is depicted in which an illustrative embodiment may be implemented. In this example, aircraft 1800 is produced by aircraft manufacturing and service method 1700 in FIG. 17 and may include airframe 1802 with plurality of systems 1804 and interior 1806. Examples of systems 1804 include one or more of propulsion system 1808, electrical system 1810, hydraulic system 1812, and environmental system 1814. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1700 in FIG. 17. In one illustrative example, components or subassemblies produced in component and subassembly manufacturing 1706 in FIG. 17 may be fabricated or manufactured in a manner similar to components or subassemblies produced while aircraft 1800 is in service 1712 in FIG. 17. For example, optical coupler systems 134 in FIG. 1 may be manufactured in accordance with an illustrative embodiment during one or more these phases of aircraft manufacturing and service method 1700.

As yet another example, one or more apparatus embodiments, method embodiments, or a combination thereof may be utilized during production stages, such as component and subassembly manufacturing 1706 and system integration 1708 in FIG. 17. One or more apparatus embodiments, method embodiments, or a combination thereof may be utilized while aircraft 1800 is in service 1712 and/or during maintenance and service 1714 in FIG. 17. For example, optical networks using optical couplers may be added or operations may be performed on optical networks in aircraft 1800 during one or more of these phases in aircraft manufacturing and service method 1700. The use of a number of the different illustrative embodiments may substantially expedite the assembly, maintenance, and/or reduce the size, weight, power and cost of aircraft 1800.

Thus, the different illustrative embodiments provide a method and apparatus for an optical coupler system. The optical coupler system in the illustrative examples may be especially suited for use with plastic optical fibers in a platform, such as an aircraft. The optical coupler system has a configuration that may reduce loss in the transmission of optical signals passing through the coupler system and which may reduce maintenance needed for the optical coupler system.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An optical coupler system comprising:
   a coupler housing having a first end and a second end;
   a mixing channel extending from the first end of the coupler housing to the second end of the coupler housing, wherein the mixing channel is configured to receive an input optical signal from a first optical fiber at the first end and split the input optical signal into a plurality of output optical signals at the second end;
   a first receptacle configured to be connected to the first end of the coupler housing, wherein the first receptacle has a main housing and a funneling structure, wherein the main housing of the first receptacle is configured to receive a first plurality of optical fibers in a channel in the main housing, and wherein a portion of the first plurality of optical fibers is unjacketed and the funneling structure of the first receptacle reduces a size of the channel of the first receptacle to receive the portion of the first plurality of optical fibers that is unjacketed; and
   a second receptacle configured to be connected to the second end of the coupler housing, wherein the second receptacle has a main housing and a funneling structure, wherein the main housing for the second receptacle is configured to receive a second plurality of optical fibers in a channel in the main housing of the second receptacle, and wherein a portion of the second plurality of optical fibers is unjacketed and the funneling structure of the second receptacle reduces a size of the channel of the second receptacle to receive the portion of the second plurality of optical fibers that is unjacketed.

2. The optical coupler system of claim 1 further comprising:
   a fastening system configured to connect the first receptacle to the first end of the coupler housing and the second receptacle to the second end of the coupler housing.

3. The optical coupler system of claim 2, wherein the fastening system is further configured to align the first plurality of optical fibers with the mixing channel and the second plurality of optical fibers with the mixing channel.

4. The optical coupler system of claim 2, wherein the fastening system comprises:
a first sleeve having a first channel configured to receive the first receptacle and the first end of the coupler housing; and
a second sleeve having a second channel configured to receive the second receptacle and the second end of the coupler housing.

5. The optical coupler system of claim 1, wherein the mixing channel comprises a mixing rod.

6. The optical coupler system of claim 5, wherein the mixing rod has a cross section that is a hexagon.

7. The optical coupler system of claim 1, wherein the mixing channel comprises an air interface column and reflective walls.

8. The optical coupler system of claim 7, wherein the mixing channel has a cross section that is a hexagon.

9. The optical coupler system of claim 1, wherein the first plurality of optical fibers and the second plurality of optical fibers are plastic optical fibers.

10. The optical coupler system of claim 1, wherein the coupler housing with the mixing channel is a star coupler.

11. The optical coupler system of claim 1, wherein the optical coupler system is used in an optical network data processing system in a platform selected from one of an aircraft, a submarine, a bus, a personnel carrier, a tank, a train, an automobile, a spacecraft, a space station, a satellite, a surface ship, a power plant, a dam, a manufacturing facility, and a building.

12. An alignment system for aligning a plurality of optical fibers in a receptacle, the alignment system comprising:
a first alignment fixture having a first plurality of holes configured to receive the plurality of optical fibers; and
a second alignment fixture having a second plurality of holes configured to receive an unjacketed portion of the plurality of optical fibers, wherein the first alignment fixture is configured to be placed relative to a first end of the receptacle and comprises removable sections and the second alignment fixture is configured to be placed relative to a second end of the receptacle.

13. A method for assembling an optical coupler system, the method comprising:
connecting a first plurality of optical fibers to a first receptacle using an alignment system to align the first plurality of optical fibers in the first receptacle;
connecting a second plurality of optical fibers to a second receptacle using the alignment system to align the second plurality of optical fibers in the second receptacle;
connecting the first receptacle to a star coupler, wherein the first plurality of optical fibers is optically connected to a mixing channel in the star coupler; and
connecting the second receptacle to the star coupler, wherein the second plurality of optical fibers is optically connected to the mixing channel in the star coupler.

14. The method of claim 13, wherein connecting the first plurality of optical fibers to the first receptacle using the alignment system to align the first plurality of optical fibers in the first receptacle comprises:
positioning the first receptacle between a first alignment structure and a second alignment structure;
inserting each of the first plurality of optical fibers through first holes in the first alignment structure, wherein the first alignment structure comprises removable sections configured to release the first plurality of optical fibers from the first holes; and
passing the each of the first plurality of optical fibers inserted through the first holes through a channel in the first receptacle and through second holes in the second alignment structure, wherein the second holes have a diameter configured to receive an unjacketed portion of the first plurality of optical fibers.

15. The method of claim 13, wherein connecting the second plurality of optical fibers to the second receptacle using the alignment system to align the second plurality of optical fibers in the second receptacle comprises:
positioning the second receptacle between a first alignment structure and a second alignment structure;
inserting each of the second plurality of optical fibers through first holes in the first alignment structure, wherein the first alignment structure comprises removable sections configured to release the second plurality of optical fibers from the first holes; and
passing the each of the second plurality of optical fibers inserted through the first holes through a channel in the second receptacle and through second holes in the second alignment structure, wherein the second holes have a diameter configured to receive an unjacketed portion of the second plurality of optical fibers.

16. The method of claim 13, wherein connecting the first receptacle to the star coupler, wherein the first plurality of optical fibers is optically connected to the mixing channel in the star coupler comprises:
connecting the first receptacle to a first end of a coupler housing for the star coupler using a fastener system, wherein the first plurality of optical fibers is optically connected to the mixing channel in the star coupler; and
wherein connecting the second receptacle to the star coupler, wherein the second plurality of optical fibers is optically connected to the mixing channel in the star coupler comprises:
connecting the second receptacle to a second end of the coupler housing for the star coupler using the fastener system, wherein the second plurality of optical fibers is optically connected to the mixing channel in the star coupler.

17. The method of claim 16, wherein the optical coupler system comprises a first sleeve having a first channel configured to receive the first receptacle and the first end of the coupler housing; and a second sleeve having a second channel configured to receive the second receptacle and the second end of the coupler housing.

18. The method of claim 13, wherein the mixing channel has a cross section that is a hexagon.

19. The method of claim 13, wherein the mixing channel comprises a mixing rod.

20. The method of claim 13, wherein the mixing channel comprises an air interface column and reflective walls.

* * * * *